United States Patent [19]

Harrell

[11] Patent Number: 5,214,108
[45] Date of Patent: May 25, 1993

[54] PROCESS FOR MODIFYING THE VISCOSITY OF COPOLYMERS OF ETHYLENE AND UNSATURATED CARBOXYLIC ACIDS

[75] Inventor: Jerald R. Harrell, Wilmington, Del.

[73] Assignee: E. I. Du Pont de Nemours and Company, Wilmington, Del.

[21] Appl. No.: 912,963

[22] Filed: Jul. 10, 1992

[51] Int. Cl.$^5$ .................. C08F 8/06; C08F 6/26
[52] U.S. Cl. ........................ 525/387; 525/360; 526/318.25; 526/329; 526/329.5; 526/329.7; 526/331; 528/485; 528/486; 528/490
[58] Field of Search ............... 525/387, 360; 526/331; 528/485

[56] References Cited

U.S. PATENT DOCUMENTS

| | | | |
|---|---|---|---|
| 3,267,083 | 8/1966 | Imhof | 260/80.5 |
| 4,304,887 | 12/1981 | Cohen | 525/329 |
| 4,987,199 | 1/1991 | Takao et al. | 525/327.3 |

*Primary Examiner*—Joseph L. Schofer
*Assistant Examiner*—Fred Zitomer
*Attorney, Agent, or Firm*—Marilyn H. Bromels

[57] ABSTRACT

The viscosity of copolymers of a) ethylene, b) $C_1$-$C_8$ acrylates, $C_1$-$C_8$ methacrylates, or vinyl esters of $C_1$-$C_8$ carboxylic acids, and c) at least one alpha, beta-unsaturated carboxylic acid of 3–12 carbon atoms selected from the group consisting of monocarboxylic acids, dicarboxylic acids, and monoesters of dicarboxylic acids is increased, while maintaining gel content at a level of less than 3%, by treatment with a mixture of an organic peroxide and a chromium (III) salt.

12 Claims, No Drawings

PROCESS FOR MODIFYING THE VISCOSITY OF COPOLYMERS OF ETHYLENE AND UNSATURATED CARBOXYLIC ACIDS

FIELD OF THE INVENTION

This invention relates to an improved process for increasing the viscosity of copolymers containing interpolymerized units of ethylene, unsaturated acids, and unsaturated esters.

BACKGROUND OF THE INVENTION

Copolymers of ethylene with alpha, beta-unsaturated acids and unsaturated esters are well-known in the art and a large number of such copolymers are available commercially, for example ethylene/methyl acrylate/methacrylic acid and ethylene/vinyl acetate/acrylic acid copolymers. In the past one of the problems associated with continuous processes for preparation of such compositions in stirred tank reactors was the tendency for large amounts of polymeric deposits to form on the inner walls of the reactors. This buildup, which consists of highly crosslinked, insoluble polymer, i.e. gel, adversely affected operation of the reactor. In addition, particles of the gel were invariably introduced into the product which tended to compromise the quality of the copolymer produced. It has recently been found that this problem can be alleviated by performing the copolymerization in the presence of small amounts of methanol or acetone, as disclosed in U.S. Pat. Nos. 5,028,674 and 5,057,593. Due to the chain transfer activity of methanol and acetone, however, in some cases the polymeric products thus obtained are of extremely low viscosity, so low in fact that they are unsuitable for many applications.

A highly effective process for increasing viscosity of such copolymers is disclosed in co-pending U.S. patent application Ser. No. 07/769,603 whereby a free radical generating agent is added to the copolymer in an amount sufficient to decrease its melt index to 0.1-15 g/10 minutes while producing a copolymer product having a gel content of less than 3%, as determined by measurement of % insolubles in boiling xylene. The process thus provides a method for increasing viscosity without concomitantly raising the gel content of the polymer or producing products which contain domains of highly crosslinked gel within the polymer matrix.

Under certain circumstances however, free radical generating agents can have deleterious effects on the physical properties of the product, for example decrease in tensile and tear strengths. In order to mitigate these effects it would therefore be desirable to employ a method to increase raw polymer viscosity which minimizes the amount of free radical generating agent used.

SUMMARY OF THE INVENTION

The present invention provides an improved process for modifying the viscosity of ethylene/unsaturated acid/unsaturated ester interpolymers wherein the amount of free radical generator used to reach a given viscosity is decreased in comparison with prior art processes. In particular, the present invention provides a process for increasing the viscosity of a copolymer of a) ethylene, b) a comonomer selected from the group consisting of $C_1$-$C_8$ alkyl esters of acrylic acid, $C_1$-$C_8$ alkyl esters of methacrylic acid, and vinyl esters of $C_2$-$C_8$ carboxylic acids, and c) at least one alpha, beta-unsaturated carboxylic acid of 3-12 carbon atoms selected from the group consisting of monocarboxylic acids, dicarboxylic acids, and monoesters of dicarboxylic acids, said copolymer having a Mooney viscosity, $ML_{(1+4)}100$, as measured according to ASTM D1646, of 1-20, which comprises treating said copolymer with a mixture of an organic peroxide and at least one chromium (III) compound selected from the group consisting of (i) chromium (III) carboxylates of the formula

$(RCOO)_3Cr$ where R is an acyclic group of 1-20 carbon atoms or an acyclic alkenyl group of 3-20 carbon atoms in which the alpha-carbon is saturated and (ii) tris(2'-hydroxyacetophenono)chromium in amounts sufficient to increase the Mooney viscosity of the copolymer at least 6 points while producing a copolymer product having a gel content of less than 3% as determined by measurement of % insolubles in boiling xylene.

DETAILED DESCRIPTION OF THE INVENTION

The copolymers suitable for viscosity modification by the process of the invention are copolymers of ethylene, unsaturated acids, and unsaturated esters. More specifically they are copolymers of ethylene and alpha, beta-unsaturated carboxylic acids of 3-12 carbon atoms selected from the group consisting of monocarboxylic acids, dicarboxylic acids, and monoesters of dicarboxylic acids. The polymers additionally contain copolymerized units of $C_1$-$C_8$ alkyl esters of acrylic or methacrylic acid or vinyl esters of a $C_2$-$C_4$ carboxylic acid.

The ethylene content of the copolymers ranges from about 25-70 weight percent of the polymer, preferably 35-65 weight percent, and the alpha, beta-unsaturated mono-or dicarboxylic acids are present in an amount sufficient to provide 0.1-10 weight percent, preferably 0.5 -5.0 weight percent of carboxylate groups. Suitable alpha, beta-unsaturated mono- or dicarboxylic acids include those having 3-12 carbon atoms, for example, monocarboxylic acids such as acrylic acid, methacrylic acid, and ethacrylic acid; dicarboxylic acids such as itaconic acid, maleic acid and fumaric acid; and monoesters of dicarboxylic acids such as ethyl hydrogen maleate, ethyl hydrogen fumarate, and 2-ethylhexyl hydrogen maleate. Acrylic acid, methacrylic acid, and ethyl hydrogen maleate are preferred. The alkyl acrylate or the vinyl ester comonomers comprise 25-70 weight percent of the polymer, preferably 30-60 weight percent. Alkyl acrylates suitable for use in the polymers include $C_1$-$C_8$ alkyl esters of acrylic acid, for example, the methyl, ethyl, isobutyl, hexyl, and 2-ethylhexyl esters. Methyl, ethyl, and butyl acrylates are preferred. Methyl acrylate is most preferred. Vinyl esters of carboxylic acids suitable for use in the polymers include vinyl esters of carboxylic acids having 2-8 carbon atoms, for example, vinyl acetate, vinyl propionate, vinyl hexanoate, and vinyl 2-ethylhexanoate. Vinyl acetate is preferred.

Mooney viscosities, $ML_{(1+4)}100$, of these copolymers prior to treatment by the process of the invention are generally within the range of 1-20, preferably 3-15, most preferably 6-10, as determined by ASTM Method D1646.

Such copolymers are generally prepared by continuous copolymerization of ethylene and the comonomers in a stirred reactor in the presence of at least one free-radical initiator at temperature of from about 120° C. to 300° C. and at pressures of from about 130 to 310 MPa. The most effective initiators have half lives of 0.1–1.0 seconds at the reactor temperature, for example, lauryl peroxide, di-t-butyl peroxide, t-butyl peracetate, di(sec-butyl)peroxy dicarbonate, t-butyl peroxy neodecanoate, and t-amyl peroxy pivalate. Most preferably the copolymers are also prepared in the presence of about 2–25 weight percent methanol or acetone so that reactor fouling is decreased or eliminated.

Representative examples of copolymers suitable for use in the practice of the invention include ethylene/methyl acrylate/ethyl hydrogen maleate copolymers, ethylene/methyl acrylate/methacrylic acid copolymers, ethylene/acrylic acid/vinyl acetate copolymers, ethylene/butyl acrylate/acrylic acid copolymers, ethylene/vinyl acetate/methacrylic acid copolymers, ethylene/fumaric acid/methyl acrylate copolymers, ethylene/ethyl hydrogen maleate/vinyl acetate copolymers, ethylene/ethyl hydrogen maleate/carbon monoxide/methyl acrylate copolymers, ethylene/methacrylic acid/carbon monoxide/vinyl acetate copolymers, and ethylene/ethyl hydrogen maleate/carbon monoxide/vinyl acetate copolymers.

According to the process of the present invention the viscosity of the above-described ethylene copolymers is increased by treatment with a mixture of an organic peroxide and a chromium (III) salt at temperatures above the decomposition point of the peroxide. Surprisingly, under such conditions these compounds act in a synergistic manner to increase polymer viscosity. That is, when a combination of the chromium III compound and peroxide is mixed with the ethylene/unsaturated acid/unsaturated ester copolymer a greater increase in Mooney viscosity is observed than that which can be attributed to the action of each reagent alone. This synergy is exhibited whether the reagents are added sequentially or simultaneously to the copolymers. By proper adjustment of the amount of peroxide and chromium compound added, the percentage of gel in the copolymer product, as determined by percent insolubles in boiling xylene, remains at very low levels, i.e. below 3%, typically below 1%. Thus, the process of the present invention provides a low gel content polymer and allows use of a reduced amount of peroxide to obtain a given viscosity increase compared with prior art processes.

Representative examples of organic peroxides which may be used in the process of the invention include dicumyl peroxide, t-butyl perbenzoate, benzoyl peroxide, t-butyl peracetate, 1,1-di(t-butylperoxy)3,3,5-trimethyl cyclohexane, 2,5-dimethyl-2,5-di-(t-butylperoxy)hexane, 2,5-dimethyl-2,5-di-(t-butylperoxy)hexyne, and n-butyl-4,4-bis(t-butylperoxy valerate). Use of a combination of more than one peroxide is advantageous in certain circumstances, although generally one peroxide is used alone.

Suitable chromium (III) compounds include chromium (III) carboxylates of the formula (RCOO)$_3$Cr where R is an acyclic alkyl group of 1–20 carbon atoms or an acyclic alkenyl group of 3–20 carbon atoms in which the alpha-carbon is saturated, i.e., the alpha-carbon is connected through three single bonds to hydrogen or carbon atoms. An additional suitable chromium (III) compound is tris(2'-hydroxyacetophenono)chromium. Examples of suitable carboxylates include acetate, propionate, 2-ethylhexanoate and other octanoates, neodecanoate, dodecanoate, 9-dodecenoate, oleate, palmitate and stearate. The preferred chromium (III) compounds are commercially available and include chromium 2-ethyl hexanoate, chromium stearate, chromium oleate, and chromium neodecanoate. The most preferred chromium (III) compound is chromium (III) 2-ethylhexanoate. The preferred chromium salts are those which are in the form of liquids or soft pastes which allows easy dispersion in the copolymer. If a solid chromium compound is used it is most effective if it is finely divided or dissolved in a small amount of solvent.

The amount of peroxide and chromium (III) salt used in the process of the invention is that which will increase the Mooney viscosity of the starting copolymer, $ML_{(1+4)}100$, at least 6 points without increasing the gel content of the polymer to above 3%, as determined by measurement of % insolubles in boiling xylene. Depending on the reactivity of the particular organic peroxide selected, quantities of 0.5–10 parts peroxide per 100 parts polymer, preferably 1–7 parts per 100 parts polymer, most preferably 1–4 parts peroxide, are usually adequate. Generally the amount of chromium (III) compound will range from 1–8, preferably from 1.5–5 milliequivalents per 100 grams copolymer. The exact quantities necessary will depend on the initial viscosity of the untreated copolymer and the degree of viscosity increase which is desired. Because selection of peroxide or chromium levels which are too high will cause crosslinking of the polymer and rapid increase in gel certain characteristics of the chromium (III) salt/peroxide system must be considered when choosing the quantity of each reagent to use. For example, it has been found that the amount of chromium salt necessary to achieve a given viscosity increase will depend upon the initial Mooney viscosity of the copolymer as well as the amount of peroxide used as a reagent. That is, a polymer having a higher initial viscosity will exhibit a greater viscosity increase when treated with a given level of chromium salt and peroxide compared to a similar polymer having a lower initial viscosity. Also, if the amount of chromium compound added is too low a synergistic interaction with the peroxide will not be observed. This lower limit varies with each particular chromium salt and depends on the solubility of the particular chromium salt in the polymer system and the level of carboxyl groups present in the polymer. Although it is necessary to take these factors into account when selecting the amount of chromium salt and peroxide to use for a particular copolymer such optimization is within the realm of routine experimentation for one skilled in the art.

Following treatment by the process of this invention the Mooney viscosities of the ethylene copolymers are generally 12–120, preferably 30–75. This Mooney viscosity range is desirable if the modified copolymer products are to find use as general purpose elastomers.

A coagent may optionally be added to the copolymer composition to enhance the efficiency of the free radical generating agent. Such compounds include triallyl cyanurate, triallyl isocyanurate, diallyl maleate, high vinyl low molecular weight butadiene, N,N'-m-phenylene dimaleimide, pentaerythritol triacrylate, pentaerythritol trimethacrylate, trimethylolpropane triacrylate, and trimethylolpropane trimethacrylate. Use of such coagents in free radical generation processes is well-established in the art.

In addition, various other ingredients commonly used in copolymer compounding may be added to the copolymer peroxide blend before the viscosity modification process takes place. Such additives include fillers, small amounts of plasticizers and processing aids.

As described above, the viscosity modification process of the present invention is performed by blending the peroxide and chromium (III) salt with the above-described ethylene copolymers and heating the blend to a temperature at which free radical generation occurs. Although it is possible to perform the process as a separate process step immediately following copolymer production, for example, just prior to isolation and after the monomers have been stripped, it is preferable to use ethylene copolymers which have been isolated as the starting material for the process.

It is possible to carry out the viscosity modification process under either dynamic or static conditions. Under dynamic conditions the copolymer is subjected to mechanical shear at elevated temperatures, whereas under static conditions no shearing force is applied. The dynamic process may take place in an internal mixer, for example a Brabender Plastograph ® internal mixer, Haake Rheocord ® internal mixer, or a Banbury ® internal mixer. The static process would be carried out most often in a hot air or microwave oven.

A variety of mixing processes are compatible with viscosity modification under dynamic conditions. For example, blending may be carried out on a small scale in, for example, a Brabender Plastograph ® internal mixer, or a Haake Rheocord ® internal mixer, by heating the mixing cavity to a temperature at which peroxide decomposition will occur. Copolymer, peroxide, chromium (III) salt and processing aids are then introduced to the mixer and the components are blended for a time sufficient to raise the temperature of the polymer to the decomposition point of the peroxide and to decompose the peroxide. On a larger scale, the heat necessary to raise the temperature of the batch to the desired level is usually derived only from the mechanical shearing of the polymer, although in some cases external heating may be necessary. For example, when a Banbury ® internal mixer is used, the copolymer, peroxide, chromium (III) salt, and processing aids are charged to the mixer and blended at high speed until the desired temperature is achieved. Mixing is then continued for a time sufficient to decompose essentially all of the peroxide. This is a preferred method of operation. This process may be further varied by mixing the chromium (III) salt with the polymer in an initial step. This procedure would be preferred if the physical form of the chromium salt required a relatively long dispersing step. In another process peroxide and chromium (III) compound are mixed into the copolymer on a two-roll mill or in an internal mixer under conditions which will not lead to decomposition of the peroxide. Viscosity modification is then effected by subjecting the polymer/peroxide/chromium (III) compound blend to a shearing force at elevated temperature using an extruder, an internal mixer, or a similar device. Another preferred method of operation is addition of all components to a Banbury ® internal mixer followed by introduction of the compounded blend to an extruder.

The most important advantage of the process of the present invention is that the amount of free radical generator necessary to obtain a given viscosity increase is reduced in comparison with prior art processes. However, a further advantage of the process of the invention is that when the peroxide/chromium III compound mixture is used as a viscosity modifier mixing time is reduced. That is, the temperature rise to the decomposition point of the peroxide occurs more rapidly in the presence of chromium III salt than in its absence. This translates to shorter mixing time which is economically advantageous.

The static process is by nature at least a two-step operation. For example, the copolymer, peroxide, chromium (III) compound and processing aids may be combined on a two-roll mill or in a mixer at a temperature below the decomposition point of the peroxide. The blend is then placed in a microwave oven, or in a hot air oven set at an elevated temperature. The static process can be performed either continuously or in a batch-wise manner.

An important feature of the invention is that the process does not result in formation of substantial quantities of gel. Specifically, under the conditions of the invention gel levels in the ethylene copolymer product of no more than 3%, usually no more than 1%, are obtained. The presence of high levels of gel can result in roughness of extrudates, poor electrical properties, and lower adhesion. Gel level in the product is determined by measurement of % insolubles in boiling xylene according to the following procedure.

A one gram sample is cut into small pieces of approximately 1 mm$^3$ and weighed to four decimal places. The sample is placed in a 300 ml flask containing 150 ml xylene and fitted with a reflux condenser and nitrogen bleed. The mixture is heated under reflux for 3 hours and then cooled to room temperature and shaken for 30 minutes on a platform shaker at a rate of approximately 185 cycles/minute. The contents of the flask are filtered through a 120 mesh stainless steel screen which has been preweighed to four decimal places. The flask is rinsed three times with 25 ml aliquots of xylene and the rinses are filtered through the screen. The screen is dried at 90°–100° C. for 30 minutes in a vacuum oven at approximately ⅓ atmosphere (0.034 MPa) and reweighed. The amount of boiling xylene insolubles is calculated using the following formula:

$$\text{Insolubles (wt \%)} = \left( \frac{wt_{(s+1)} - wt_s}{wt_o} \right) \times 100$$

where $wt_{(s+i)}$ = Weight of Screen After Drying
$wt_s$ = Original Weight of Screen
$wt_o$ = Original Weight of Polymer Sample.

In those cases wherein the crystallinity of the ethylene copolymers is high, i.e. the ethylene content of the copolymer is, for example, about 90 mole %, the copolymers are not completely soluble in cold xylene. During the cooling stage of the above procedure such copolymers tend to precipitate, thus introducing error in the measurement of % gel. In such cases the filtration step must be done while the temperature of the xylene solution is above 100° C.

Polymers prepared by the process of the invention are useful in the fabrication of adhesives, gaskets, seals, hose, tubing, cable jackets, vibration dampers, and coating compositions, including wire coatings. Because of their low gel content the copolymers are particularly suited for preparation of semi-conductive wire coverings, adhesives, and coating compositions.

The invention is further illustrated by reference to the following examples wherein all parts are by weight unless otherwise specified.

EXAMPLES

TEST METHODS

All Mooney viscosities are reported as $ML_{(1+4)}100$ and were determined according to ASTM D1646, 100° C., 1 minute preheat, viscosity measured at 4 minutes.

All gel contents were determined as % insolubles in boiling xylene.

EXAMPLE 1

One hundred parts of a copolymer of ethylene, methyl acrylate, and ethyl hydrogen maleate (wt. ratio 40.3/55.6/4.1, Mooney viscosity 6; 0.29% gel) was blended with 2.2 parts of Luperco ® 231XL peroxide [40% 1,1-di(t-butylperoxy)3,3,5-trimethyl cyclohexane on an inert support], 1.5 parts (4.8 meq). chromium octoate (Shepard Chemical Co., 50.9% chromium 2-ethylhexanoate active ingredient) and 0.5 parts Vanfre ® VAM (a complex organic alkyl acid phosphate processing aid), on a two-roll rubber mill at room temperature. 260 g of the blend was then charged to a small electrically heated Brabender Plastograph ® internal mixer. The mixer temperature was set at 160° C. with the rotor speed being 40 RPM. After the blend was charged the ram was lowered and the temperature of the blend gradually increased. Mixing continued for 4 minutes after the polymer temperature reached approximately 160° C., total mixing time being 5.6 minutes. The polymer, which had an internal temperature of 162° C., was then removed. The treated polymer had a Mooney viscosity of 89 and a gel content of 0.19%. Two control samples, Control Sample 1A and Control Sample 1B, were also prepared using the same procedure except that Control Sample 1A contained no peroxide, and Control Sample 1B contained no chromium octoate. After treatment Control Sample 1A had a Mooney viscosity of 25 while Control Sample 1B had a Mooney viscosity of 18. The viscosity increase attributable to peroxide alone was thus 12 Mooney points and that attributable to chromium octoate alone was 19 Mooney points. The viscosity increase when both peroxide and chromium octoate were present was 83 Mooney points. This illustrates the synergistic effect of the combination of peroxide and chromium III salt in increasing polymer viscosity. It also illustrates that in order to obtain a polymer having a Mooney viscosity of 89 much more peroxide free radical generator would have to be used according to the prior art process wherein chromium salt is not present than in the process of the invention which employs a combination of chromium salt and peroxide.

EXAMPLE 2

A polymer blend, Sample 2, was prepared as described in Example 1 using the same materials and ratios of polymer to other reagents, except that 1 part (3.2 meq.) of chromium octoate was used in place of 1.5 parts chromium octoate.

A 260 g sample of the blend was further mixed in a Brabender Plastograph ® internal mixer, the total mixing time being 6.6 minutes. The polymer blend, which had an internal temperature of 162° C., was then removed. The treated polymer had a Mooney viscosity of 47 and a gel content of 0.11%. Two control samples, Control Sample 2A and Control Sample 2B, were also prepared using the same procedure except that Control Sample 2A contained no peroxide, and Control Sample 2B contained no chromium 2-ethylhexanoate. After treatment under these dynamic conditions Control Samples 2A and 2B both had Mooney viscosities of 15. The viscosity increase attributable to the use of peroxide alone is thus approximately 9 Mooney points and that attributable to chromium octoate alone is also 9 Mooney points. the viscosity increase when both peroxide and chromium octoate are present is 41 Mooney points.

Approximately 60 g of the Sample 2 polymer blend was placed in a hot air oven set at 180° C. A thermocouple was imbedded in the center of the sample to monitor sample temperature. Similar samples of the two control blends, 2A and 2B, were also placed in the oven. After approximately 10 minutes the internal temperature of the blend sample registered 160° C. After 5 more minutes the samples were removed. The Mooney viscosity of the Sample 2 blend treated under these static conditions was 53 while that of Sample 2A was 12 and that of Sample 2B was 15. The gel content of the Example 2 blend after static treatment was 0.35%.

This example illustrates that static as well as dynamic conditions may be used in the process of the invention with similar results. It also illustrates the synergistic effect of the combination of peroxide with chromium III salts on viscosity modification. That is, the increase in viscosity attributable to peroxide alone is 9 Mooney points under both dynamic and static conditions. The increase in viscosity attributable to chromium octoate alone is 9 Mooney points under dynamic conditions and 6 Mooney points under static conditions. The increase in viscosity when both peroxide and chromium octoate are present is 41 Mooney points under dynamic conditions and 47 Mooney points under static conditions.

EXAMPLE 3

One hundred parts of a copolymer of ethylene, methyl acrylate, and methacrylic acid (wt. ratio 37.6/59.1/3.3; Mooney viscosity 7; gel content 0.2%) was blended with 3 parts of Luperco ® 231XL peroxide [40% 1,1-di(t-butylperoxy)3,3,5-trimethyl cyclohexane on an inert support], 1 part (3.2 meq.) chromium octoate (Sheperd Chemical Co., 50.9% chromium 2-ethylhexanoate active ingredient) and 0.5 parts Vanfre ® VAM (a complex organic alkyl acid phosphate processing aid), on two-roll rubber mill at room temperature. A 260 g sample of the blend was then charged to a small electrically heated Brabender Plastograph ® internal mixer. The mixer temperature was set at 160° C. with the rotor speed being 40 RPM. After the blend was charged, the ram was lowered and the temperature of the blend gradually increased. Mixing continued for 4 minutes after the polymer temperature reached approximately 160° C., total mixing time being 6.5 minutes. The polymer was then removed from the mixer. The treated polymer had a Mooney viscosity of 102 and a gel content of 1.6%. Two control samples, Control Sample 3A and Control Sample 3B, were also prepared using the same procedure, ingredients, and weight ratios, except that Control Sample 3A contained no peroxide and Control Sample 3B contained no chromium octoate. After treatment Control Sample 3A had a Mooney viscosity of 24 and Control Sample 3B had a Mooney viscosity of 32. The viscosity increase attributable to peroxide alone was thus 25 Mooney points and that attributable to chromium octoate alone was 17 Mooney points. The viscosity increase when both peroxide and chromium octoate were present was 95 Mooney points.

EXAMPLE 4

One hundred parts of a copolymer of ethylene, methyl acrylate, and ethyl hydrogen maleate (wt. ratio 40.3/55.6/4.1; Mooney viscosity 6) was blended with 2.2 parts of Luperco® 231 XL peroxide, 1.5 parts (5 meq.) chromium stearate, and 0.5 parts Vanfre® VAM processing aid on a two-roll rubber mill at room temperature. 260 g of the blend was then charged to a small electrically heated Brabender Plastograph® internal mixer. The mixer temperature was set at 160° C. with the rotor speed being 40 RPM. After the blend was charged, the ram was lowered and the temperature of the blend gradually increased. Mixing continued for 4 minutes after the polymer temperature reached approximately 160° C., total mixing time being 7 minutes. The polymer was removed from the mixer. The treated polymer had a Mooney viscosity of 29 and a gel content of 0.24%. Two control samples, Control Sample 4A and Control Sample 4B, were also prepared using the same procedure, ingredients, and weight ratios, except that Control Sample 4A contained no peroxide and Control Sample 4B contained no chromium stearate. After treatment Control Sample 4A had a Mooney viscosity of 12 and Control Sample 4B had a Mooney viscosity of 16. The viscosity increase attributable to peroxide alone was thus 10 Mooney points and that attributable to chromium stearate alone was 6 Mooney points. The viscosity increase when both peroxide and chromium stearate were present was 23 Mooney points.

EXAMPLE 5

One hundred parts of a copolymer of ethylene, methyl acrylate, and ethyl hydrogen maleate (wt. ratio 37.6/51.4/11; Mooney viscosity 12) was blended with 1.7 parts of Luperco® 231XL peroxide [40% 1,1-di(t-butylperoxy)3,3,5-trimethyl cyclohexane on an inert support], 0.5 parts (1.6 meq.) chromium octoate (Sheperd Chemical Co., 50.9% chromium 2-ethylhexanoate active ingredient) and 0.5 parts Vanfre® VAM (a complex organic alkyl acid phosphate processing aid) on a two-roll rubber mill at room temperature. A 55 g sample of the blend was then charged to a small electrically heated Brabender Plastograph® internal mixer. The mixer temperature was set at 160° C. with the rotor speed being 40 RPM. After the blend was charged, the ram was lowered and the temperature of the blend gradually increased. Mixing continued for 4 minutes after the polymer temperature reached approximately 160° C., total mixing time being 6.7 minutes. The polymer was then removed from the mixer. The treated polymer had a Mooney viscosity of 24 and a gel content of 0.52%. Two control samples, Control Sample 5A and Control Sample 5B, were also prepared using the same procedure, ingredients, and amounts, except that Control Sample 5A contained no peroxide, and Control Sample 5B contained no chromium octoate. After treatment Control Sample 5B had a Mooney viscosity of 17 and Control Sample 5A had a Mooney viscosity of 14. The viscosity increase attributable to peroxide alone was thus 5 Mooney points and that attributable to chromium octoate alone was 2 Mooney points. The viscosity increase when both peroxide and chromium octoate were present was 12 Mooney points.

EXAMPLE 6

Fifty parts of a terpolmer of ethylene, methyl acrylate, and ethyl hydrogen maleate (wt. ratio 40.3/55.6/4.1; Mooney viscosity 6; 0.29% gel) was added to an F80 Banbury® internal mixer equipped with ST rotors. This was followed by addition of 2.2 parts Luperco® 231XL peroxide, 0.7 parts (2.2 meq.) chromium octoate (Sheperd Chemical Co., 50.9% chromium 2-ethylhexanoate active ingredient) 0.5 parts Vanfre® VAM (a complex organic alkyl acid phosphate processing aid), and an additional 50 parts polymer. The batch size was 63.5 kg. The ram was lowered and the batch mixed at 95 RPM. Mechanical shearing gradually raised the temperature of the batch. Volatiles, primarily moisture, were vented during the period when the batch temperature increased from approximately 107° C. to 132° C. When the temperature of the batch reached 154° C. the rotor speed was reduced to 50 RPM and mixing was continued for 3 minutes. Total mix time was 6.3 minutes. The polymer was then removed from the mixer. The product had a Mooney viscosity of 48 and a gel content of 0.15%. A comparative example, Sample 6A, was prepared in a similar manner, except that no chromium octoate was present. The total time to reach 154° C. plus the 3 minute mix at 154° C. was 7.9 minutes. The product had a Mooney viscosity of 18 and a gel content of 0.23%.

This example illustrates a further advantage of the process of the present invention, i.e. mix time is reduced when both peroxide and chromium III salt are present. The example also shows that a reduced amount of free radical generating agent is necessary to reach a given viscosity in the presence of chromium III salts.

EXAMPLE 7

One hundred parts of a copolymer of ethylene, methyl acrylate, and ethyl hydrogen maleate (wt ratio 40.3/55.6/4.1, Mooney viscosity 6; gel content 0.29%) was blended with 1.7 parts of Luperco® 231XL peroxide, 0.5 parts of a high vinyl low molecular weight polybutadiene coagent, 0.5 part (1.6 meq.) chromium 2-ethylhexanoate (chromium octoate from Sheperd Chemical Co., 50.9% active ingredient) and 0.5 parts Vanfre® VAM processing aid on a two-roll rubber mill at room temperature.

55 g of the blend was then charged to a small electrically heated Brabender Plastograph® internal mixer. The mixer temperature was set at 160° C. with the rotor speed being 40 RPM. After the blend was charged, the ram was lowered and the temperature of the blend gradually increased. Mixing continued for 4 minutes after the polymer temperature reached approximately 160° C., total mixing time being 7.3 minutes. The polymer was then removed from the mixer. The treated polymer had a Mooney viscosity of 27 and a gel content of 0.31%.

Two control samples, Control Sample A and Control Sample B were also prepared using the same procedure except that Control Sample A contained no peroxide/coagent, and Control Sample B contained no chromium 2-ethylhexanoate. After treatment Control Sample A had a Mooney viscosity of 7, while Control Sample B had a Mooney viscosity of 15.

The viscosity increase attributable to peroxide alone was thus 9 Mooney points and that attributable to chromium octoate alone was 1 Mooney point. The viscosity increase when both peroxide and chromium octoate were present was 21 Mooney points.

What is claimed is:

1. A process for increasing the viscosity of a copolymer of a) ethylene, b) a comonomer selected from the group consisting of $C_1$–$C_8$ alkyl esters of acrylic acid, $C_1$–$C_8$ alkyl esters of methacrylic acid, and vinyl esters of $C_2$–$C_8$ carboxylic acids, and c) at least one alpha, beta-unsaturated carboxylic acid of 3–12 carbon atoms selected from the group consisting of monocarboxylic acids, dicarboxylic acids, and monoesters of dicarboxylic acids, said copolymer having a Mooney viscosity, $ML_{(1+4)}100$, as measured according to ASTM D1646, of 1–20, which comprises treating said copolymer with a mixture of an organic peroxide and at least one chromium (III) compound selected from the group consisting of (i) chromium (III) carboxylates of the formula $$(RCOO)_3Cr$$

where R is an acyclic group of 1–20 carbon atoms or an acyclic alkenyl group of 3–20 carbon atoms in which the alpha-carbon is saturated, and (ii) tris(2'-hydroxyacetophenono)chromium in amounts sufficient to increase the Mooney viscosity of the copolymer at least 6 points while producing a copolymer product having a gel content of less than 3% as determined by measurement of % insolubles in boiling xylene.

2. The process of claim 1 wherein the copolymer product has a gel content of less than 1% as determined by measurement of % insolubles in boiling xylene.

3. The process of claim 1 wherein the copolymer is treated with 0.5–10 parts of an organic peroxide per 100 parts copolymer.

4. The process of claim 1 wherein the copolymer is treated with 1–8 milliequivalents of chromium (III) compound per 100 parts copolymer.

5. The process of claim 1 wherein the copolymer is a copolymer of ethylene and a $C_1$–$C_8$ alkyl acrylate or a $C_1$–$C_8$ alkyl methacrylate.

6. The process of claim 1 wherein the copolymer is a copolymer of ethylene, vinyl acetate, and another comonomer, wherein the other comonomer is acrylic acid or methacrylic acid.

7. The process of claim 1 wherein the component b) comonomer is selected from the group consisting of methyl acrylate, ethyl acrylate, butyl acrylate, and vinyl acetate.

8. The process of claim 1 wherein the component b) comonomer is methyl acrylate and the component c) comonomer is ethyl hydrogen maleate.

9. The process of claim 1 wherein the chromium (III) compound is a chromium (III) carboxylate.

10. The process of claim 9 wherein the chromium (III) carboxylate is chromium 2-ethylhexanoate.

11. The process of claim 1 wherein the chromium (III) compound is tris(2'-hydroxyacetophenono)chromium.

12. The process of claim 1 wherein a coagent is additionally present.

* * * * *